United States Patent
Lee et al.

(10) Patent No.: US 11,560,114 B2
(45) Date of Patent: Jan. 24, 2023

(54) AIRBAG APPARATUS

(71) Applicant: HYUNDAI MOBIS CO., LTD., Seoul (KR)

(72) Inventors: Choong Ryung Lee, Yongin-si (KR); Sang Won Hwangbo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 154 days.

(21) Appl. No.: 17/096,134

(22) Filed: Nov. 12, 2020

(65) Prior Publication Data

US 2021/0146874 A1 May 20, 2021

(30) Foreign Application Priority Data

Nov. 18, 2019 (KR) .................. 10-2019-0147467

(51) Int. Cl.
*B60R 21/2338* (2011.01)
*B60R 21/231* (2011.01)
(Continued)

(52) U.S. Cl.
CPC ........ *B60R 21/2338* (2013.01); *B60R 21/207* (2013.01); *B60R 21/233* (2013.01); *B60R 21/23138* (2013.01); *B60R 2021/0048* (2013.01); *B60R 2021/0058* (2013.01); *B60R 2021/23146* (2013.01); *B60R 2021/23386* (2013.01)

(58) Field of Classification Search
CPC .............. B60R 21/2338; B60R 21/207; B60R 21/23138; B60R 21/233; B60R 2021/0048; B60R 2021/0058; B60R 2021/23146; B60R 2021/23386; B60R 2021/0004; B60R 2021/0006
See application file for complete search history.

(56) References Cited

U.S. PATENT DOCUMENTS 10,870,405 B2 * 12/2020 Kwon ............... B60R 21/23138
11,390,238 B2 * 7/2022 Shin .................. B60R 21/23138
(Continued)

FOREIGN PATENT DOCUMENTS

DE 102019124091 A1 * 7/2020
DE 102020130158 A1 * 5/2021 ........... B60R 21/207
(Continued)

OTHER PUBLICATIONS

Mingxi, et al DE 10 2019 124091 Airbag assembly for a vheilce occupant restraint system, Machine English Translation, ip.com (Year: 2019).*
(Continued)

*Primary Examiner* — Karen Beck
(74) *Attorney, Agent, or Firm* — NovoTechIP International PLLC (57) ABSTRACT

Disclosed herein is an airbag apparatus that includes a pair of main cushions installed to respective left and right sides of a seat back and deployed forward when gas is delivered to an internal filling chamber, to restrain a passenger from sides, and a pair of auxiliary cushions coupled to respective front ends of the main cushions while in communication with the main cushions and deployed laterally at one ends thereof to restrain the passenger from a front.

10 Claims, 7 Drawing Sheets

(51) Int. Cl.
    *B60R 21/233*     (2006.01)
    *B60R 21/207*     (2006.01)
    *B60R 21/00*     (2006.01)

(56) References Cited

U.S. PATENT DOCUMENTS

| | | | |
|---|---|---|---|
| 2017/0259774 A1* | 9/2017 | Matsushita | B60R 22/00 |
| 2019/0283700 A1* | 9/2019 | Kwon | B60R 21/23138 |
| 2020/0331421 A1* | 10/2020 | Saito | B60N 2/42745 |
| 2020/0406855 A1* | 12/2020 | Saito | B60R 21/2338 |
| 2022/0089118 A1* | 3/2022 | Schneider | B60R 21/233 |

FOREIGN PATENT DOCUMENTS

| | | | | |
|---|---|---|---|---|
| DE | 102020101051 A1 * | 7/2021 | | |
| EP | 3747707 A1 * | 12/2020 | | B60R 21/207 |
| EP | 3831673 A1 * | 6/2021 | | B60R 21/207 |
| KR | 10 2064842 B2 * | 10/2020 | | |
| KR | 20210065628 A * | 6/2021 | | |
| KR | 20210140893 A * | 11/2021 | | |
| KR | 20220046338 A * | 4/2022 | | |
| WO | WO-2019121222 A1 * | 6/2019 | | |
| WO | WO-2019197164 A1 * | 10/2019 | | B60R 21/16 |

OTHER PUBLICATIONS

Jing et al. KR 10-2064842 B1 Airbag Apparatus of vehicle, English machine translation, ip.com (Year: 2020).*

* cited by examiner

AIRBAG APPARATUS

CROSS-REFERENCE TO RELATED APPLICATION

This application claims priority from and the benefit of Korean Patent Application No. 10-2019-0147467, filed on Nov. 18, 2019, which is hereby incorporated by reference for all purposes as if set forth herein.

BACKGROUND

Field

Exemplary embodiments of the present disclosure relate to an airbag apparatus, and more particularly, to an airbag apparatus capable of deploying an airbag to cover the side and front of a passenger in the event of a vehicle collision, thereby restraining a behavior of the passenger to protect the passenger.

Discussion of the Background

In general, an airbag apparatus for vehicles is to instantaneously inflate an air bag in the event of a vehicle collision to reduce injuries due to impact.

Such an airbag apparatus is mounted on a steering wheel of a driver's seat or a passenger's seat, and prevents injuries to passengers by deploying a cushion with the gas supplied from an inflator when an impact occurs on a vehicle.

However, a conventional airbag apparatus may deteriorate passenger protection performance as the seating conditions (movement, rotation, relaxation, etc.) of vehicle seats are changed. The existing concepts of omnidirectional airbags designed to compensate for this issue do not properly implement forward restraint performance because an airbag is separated laterally from a passenger when the passenger is loaded onto a cushion in an accident situation.

SUMMARY

Various embodiments are directed to an airbag apparatus capable of deploying main and auxiliary cushions through sides of a seat in the event of a vehicle collision so as to restrain a behavior of a passenger that is out of the protection area of front and side airbags for responding to front and side collisions, thereby protecting the passenger.

Various embodiments are directed to an airbag apparatus capable of deploying an airbag to cover the side and front of a passenger seated on a seat so as to maintain passenger protection performance in response to various seating conditions (angle, movement, rotation, etc.) and to partially restrain a forward behavior of the passenger, thereby reducing kinetic energy of the passenger in a head-on collision situation to reduce injuries to the passenger.

In an embodiment, there is provided an airbag apparatus that includes a pair of main cushions respectively installed to both sides of a seat back and deployed forward when gas is delivered to an internal filling chamber, to restrain a passenger from sides, and a pair of auxiliary cushions coupled to respective front ends of the main cushions while in communication with the main cushions and deployed laterally at one ends thereof to restrain the passenger from a front.

The airbag apparatus may further include a pair of tethers coupled to the respective left and right sides of the seat back. The tethers may be configured such that both longitudinal ends thereof are coupled to the seat back and longitudinal latching sections thereof are mounted on respective front surfaces of the auxiliary cushions, and the tethers exert a tensile force rearward when the main and auxiliary cushions are deployed.

The tethers may include longitudinal first connection ends coupled to an upper end of the seat back, and opposite second connection ends respectively coupled to both sides of a lower end of the seat back.

The first connection ends may be coupled closer to a center position between the left and right sides of the seat back, compared to the second connection ends.

The airbag apparatus may further include one fastening member coupled to the upper end of the seat back. The pair of tethers may be configured such that the first connection ends are coupled to the fastening member.

The airbag apparatus may further include a pair of insertion holes vertically formed at left and right sides of the fastening member provided at the upper end of the seat back, and a pair of lower headrest connecting beams vertically movably inserted into the insertion holes. The pair of tethers may be coupled to the fastening member by the first connection ends through rear sides of the headrest connecting beams from left and right sides of a headrest.

The airbag apparatus may further include a pair of fastening members coupled to left and right sides of the upper end of the seat back. The pair of tethers may be configured such that the first connection ends are connected to the opposite fastening members, respectively, while intersecting in the left and right directions through the front of the seat back.

Each of the main cushions may include a first side body configured to cover an upper body of the passenger from side when deployed, a second side body bent from an upper end of the first side body and extending obliquely toward the passenger when deployed, so as to cover a shoulder of the passenger from above, and a third side body bent from an upper end of the second side body and extending upward when deployed, so as to cover a head of the passenger from the side.

Each of the auxiliary cushions may include a connection part extending obliquely downward toward a front of the passenger from a front end of the second side body when deployed, and a front support part extending downward from a front end of the connection part when deployed, and positioned in the front of the passenger.

The front support part may be provided, at its front, with at least one connector so that a latching section of an associated one of the tethers is coupled to the connector.

The connector may have a hollow through which the latching section is coupled, and the latching section may be movably coupled through the hollow.

The main and auxiliary cushions may be accommodated and disposed in installation spaces defined at the left and right sides of the seat back, and protrude to the outside through front sides of the installation spaces when deployed. The pair of tethers may be accommodated and disposed in the installation spaces, and the latching sections may protrude to the outside through the installation spaces when deployed.

The airbag apparatus may further include a gas supply unit provided in the seat back to supply gas to the main cushions.

As apparent from the above description, according to the present disclosure, it is possible to protect a passenger by restraining the behavior of the passenger that is out of the protection areas of the front and side airbags for responding to front and side collisions, and to maintain the passenger protection performance in response to various seating conditions (angle, movement, rotation, etc.).

In addition, it is possible to reduce the kinetic energy of the passenger in a head-on collision situation by partially restraining the forward behavior of the passenger and thus to reduce injuries to the passenger. Furthermore, it is possible to reduce injuries to the passenger by restraining the armpit (shoulder) of the passenger, which is a body structure with relatively high rigidity.

DETAILED DESCRIPTION OF THE ILLUSTRATED EMBODIMENTS

Hereinafter, exemplary embodiments according to the present disclosure will be described in detail with reference to the accompanying drawings.

Advantages and features of the present disclosure, and a method of achieving the same will become apparent with reference to the embodiments described below in detail in conjunction with the accompanying drawings.

The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The disclosure is only defined by the scope of the claims.

In certain embodiments, detailed descriptions of technologies well known in the art may be omitted to avoid obscuring appreciation of the disclosure by a person of ordinary skill in the art.

Figure 1:
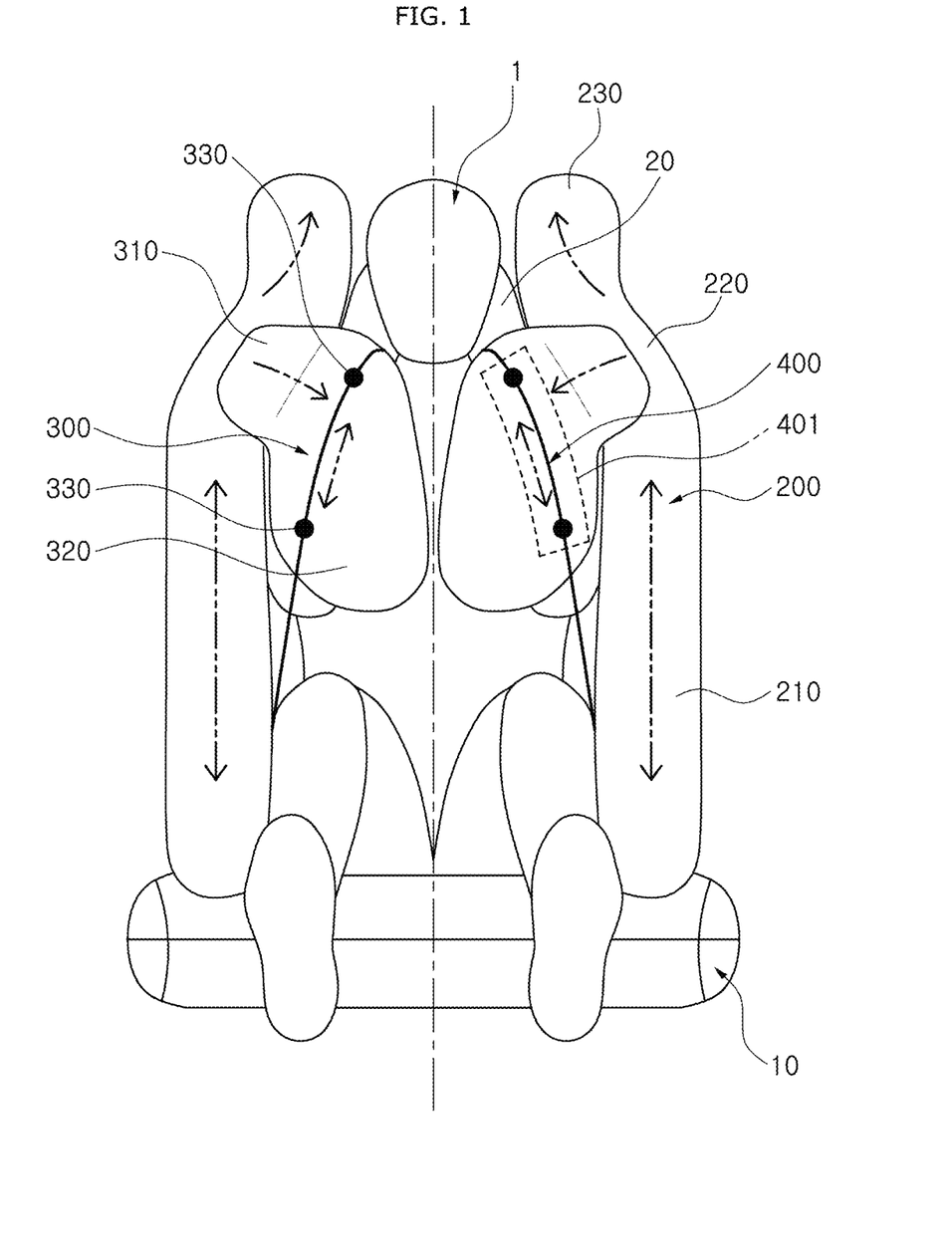
FIG. 1 is a front view illustrating an airbag apparatus according to the present disclosure.
Figure 2:
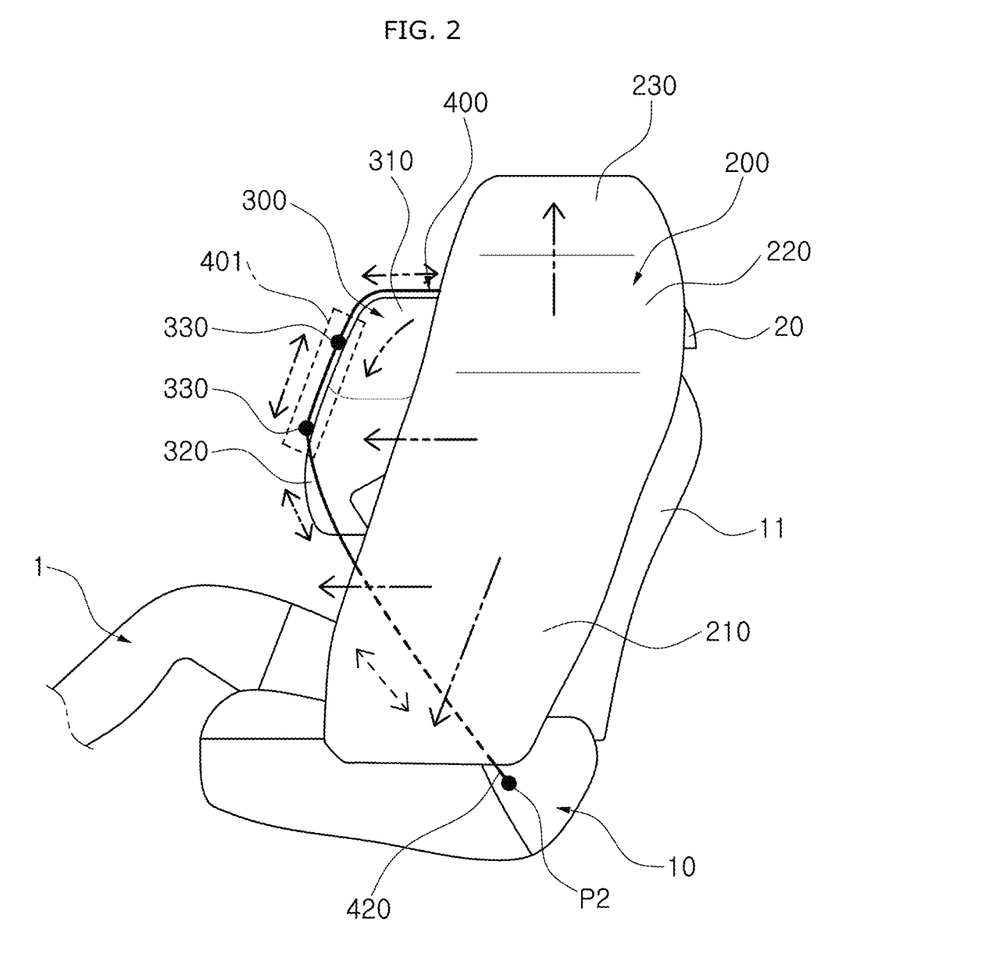
FIG. 2 is a side view illustrating the airbag apparatus according to the present disclosure.
Figure 3:
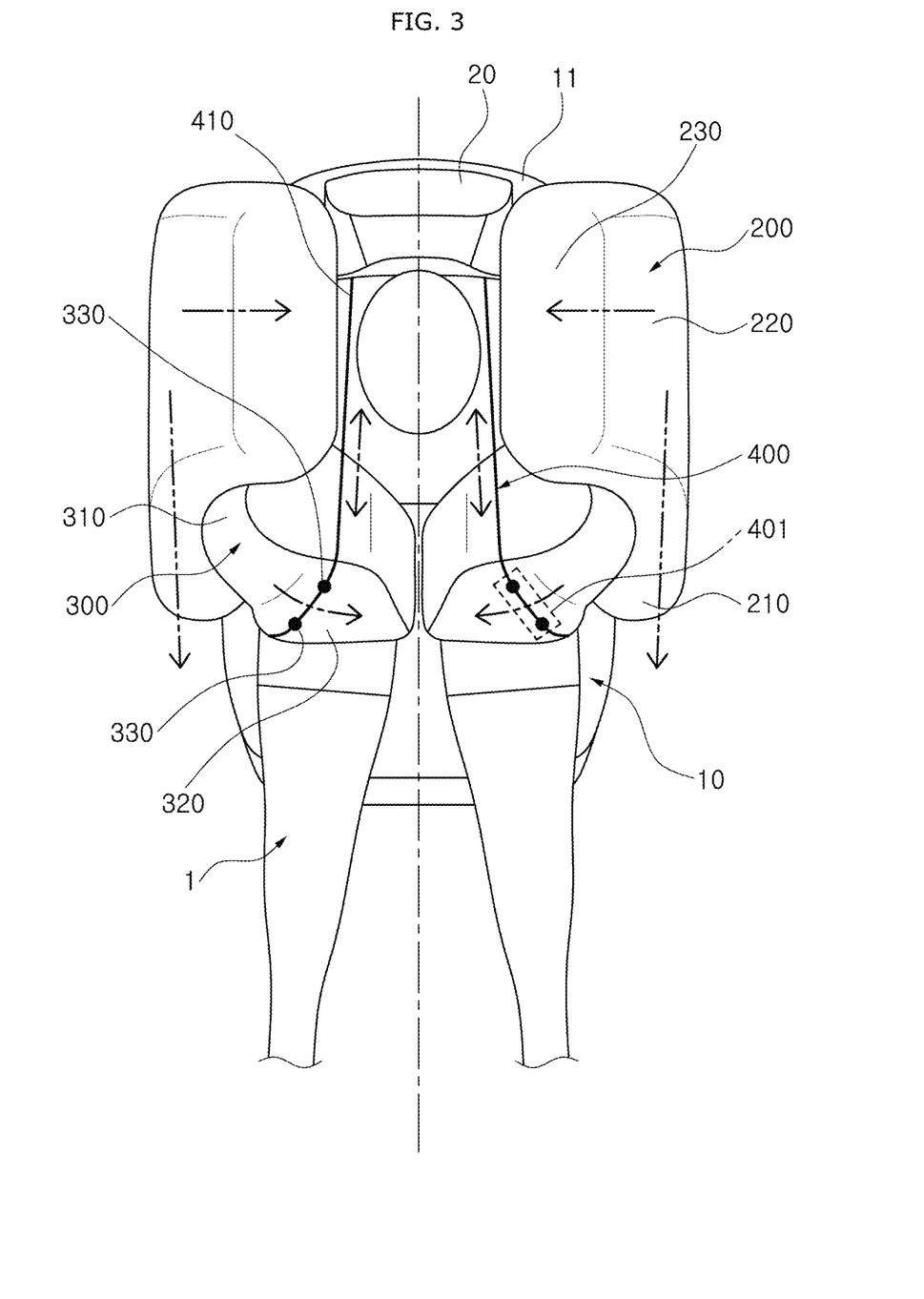
FIG. 3 is a top view illustrating the airbag apparatus according to the present disclosure.

FIG. 1 is a front view illustrating an airbag apparatus according to the present disclosure. FIG. 2 is a side view illustrating the airbag apparatus according to the present disclosure. FIG. 3 is a top view illustrating the airbag apparatus according to the present disclosure.

Figure 4:
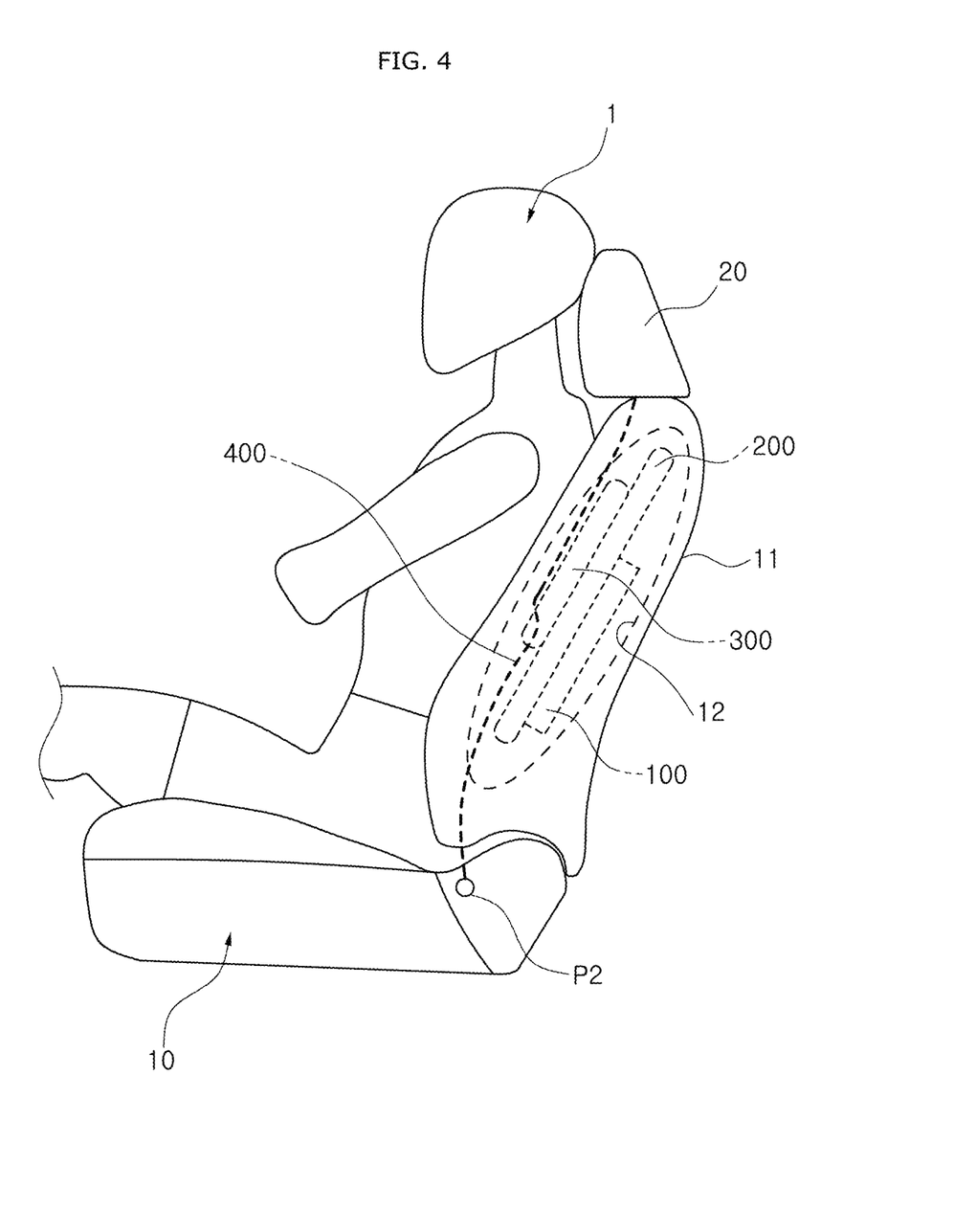
FIG. 4 is a side view illustrating a state in which main and auxiliary cushions and tethers are accommodated in installation spaces in the airbag apparatus according to the present disclosure.
Figure 5:
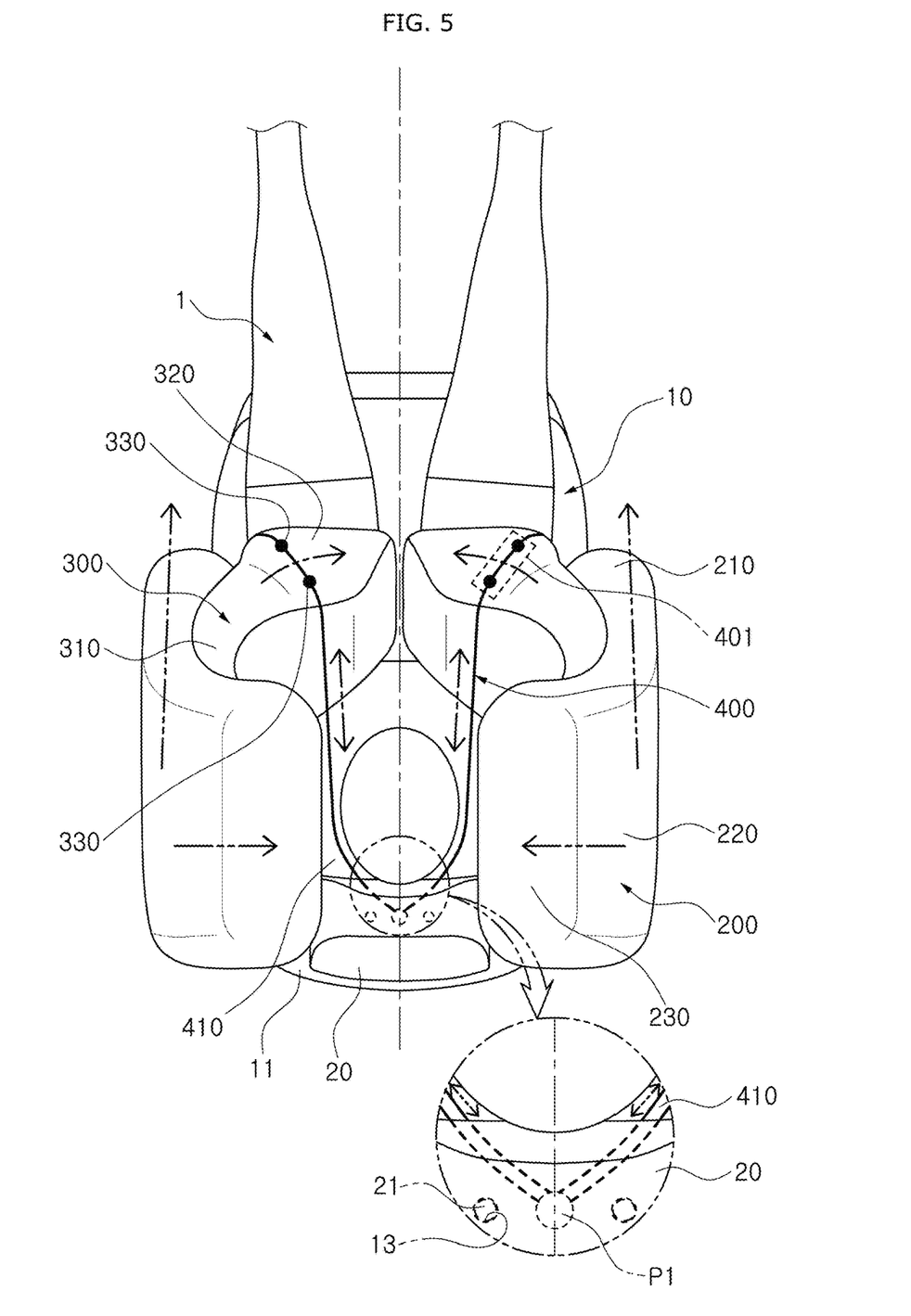
FIG. 5 is a view illustrating a state in which first connection ends of the tethers are connected to one tether fastening member in the airbag apparatus according to the present disclosure.

FIG. 4 is a side view illustrating a state in which main and auxiliary cushions and tethers are accommodated in installation spaces in the airbag apparatus according to the present disclosure. FIG. 5 is a view illustrating a state in which first connection ends of the tethers are connected to one tether fastening member in the airbag apparatus according to the present disclosure.

Figure 6:
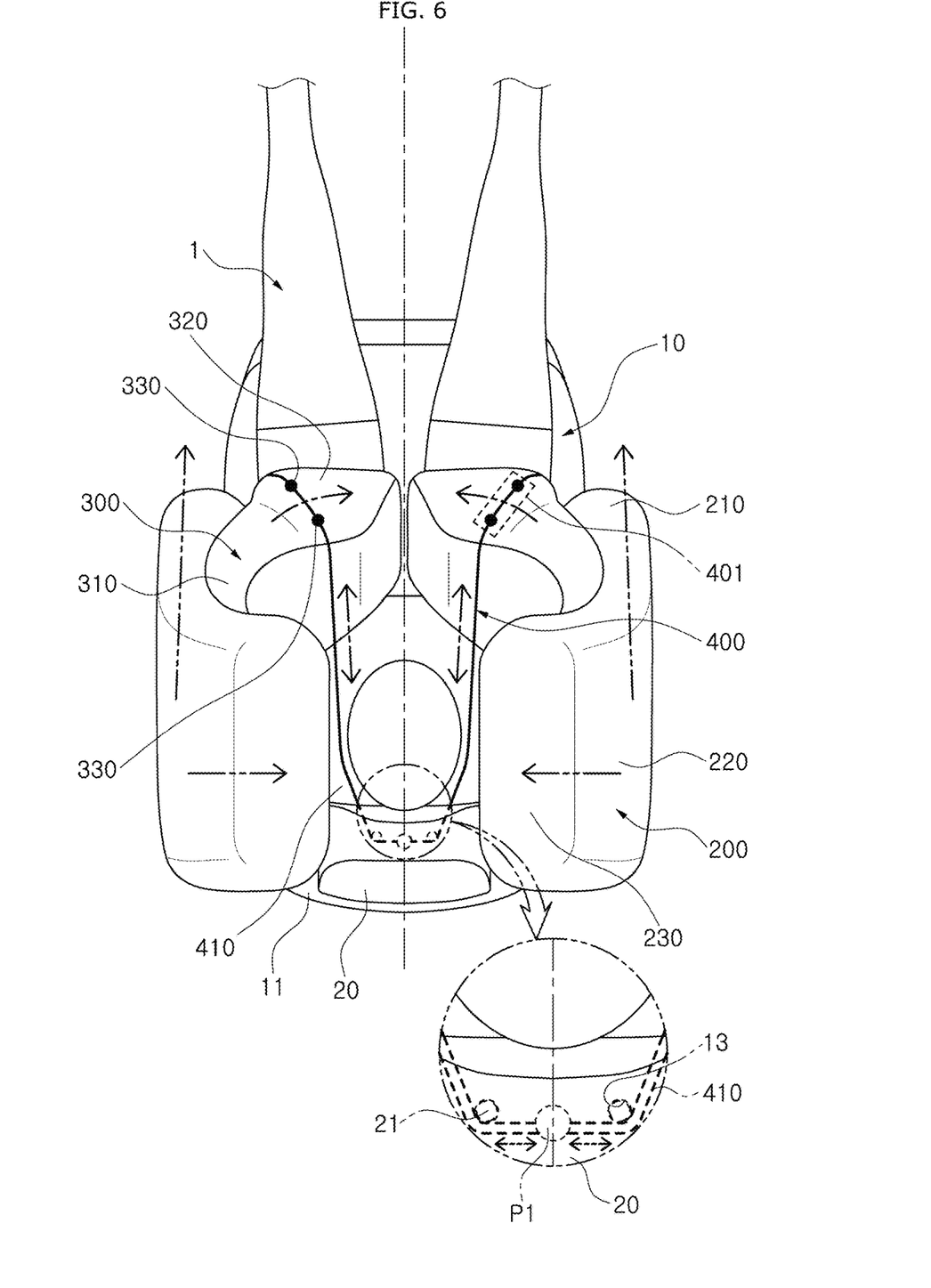
FIG. 6 is a view illustrating a state in which the first connection ends of the tethers are connected to the tether fastening member through the rear sides of connection beams in the airbag apparatus according to the present disclosure.
Figure 7:
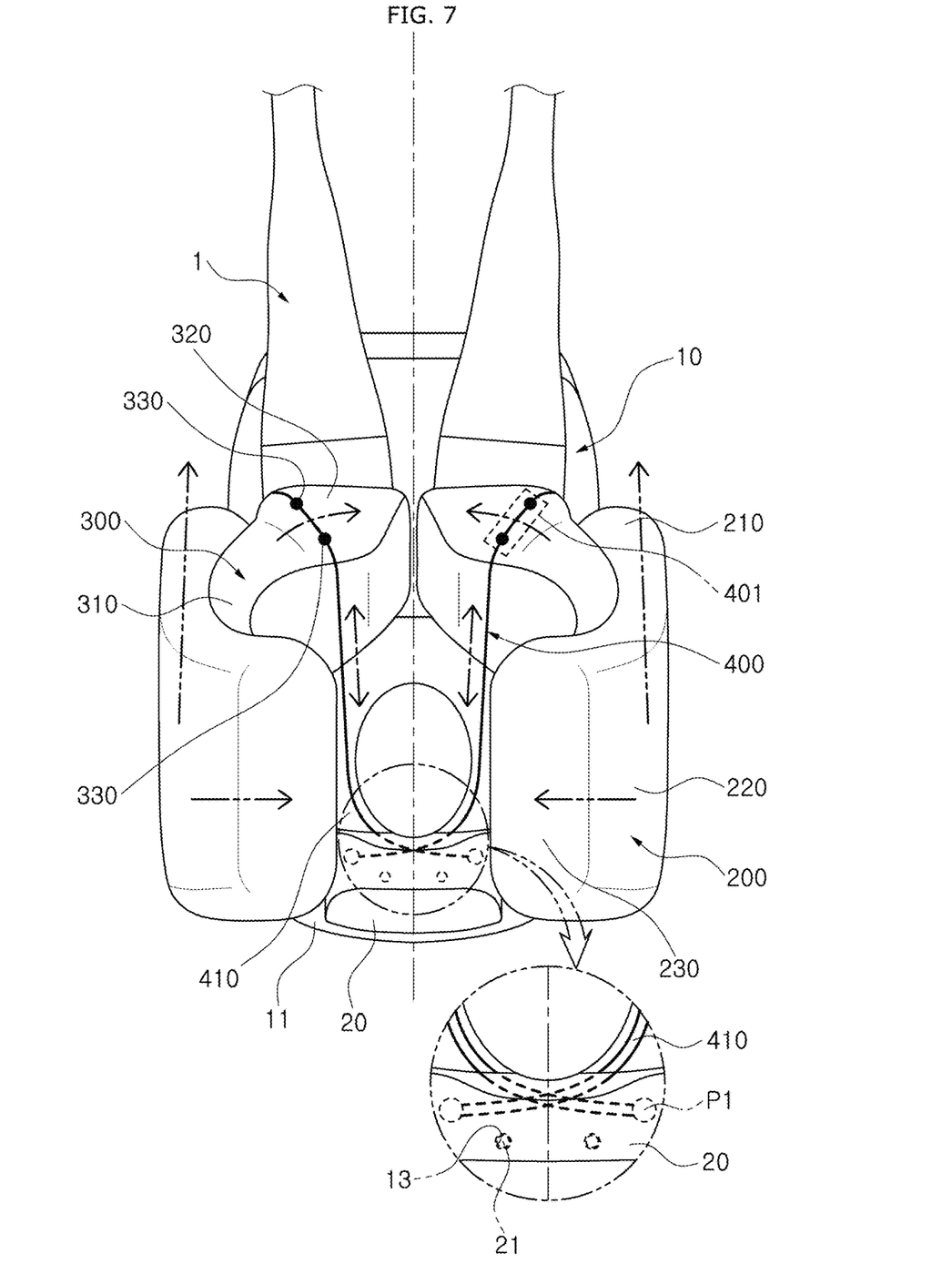
FIG. 7 is a view illustrating a state in which the first connection ends of the tethers are connected to a pair of tether fastening members, respectively, in the airbag apparatus according to the present disclosure.

FIG. 6 is a view illustrating a state in which the first connection ends of the tethers are connected to the tether fastening member through the rear sides of connection beams in the airbag apparatus according to the present disclosure. FIG. 7 is a view illustrating a state in which the first connection ends of the tethers are connected to a pair of tether fastening members, respectively, in the airbag apparatus according to the present disclosure.

As illustrated in FIGS. 1 to 7, the airbag apparatus according to the present disclosure is installed in a seat back 11 of a vehicle seat 10, and is intended to instantaneously cover and protect a passenger in the event of a collision.

To this end, the airbag apparatus according to the present disclosure includes gas supply units 100, a pair of main cushions 200, a pair of auxiliary cushions 300, and a pair of tethers 400.

The gas supply units 100 are installed in the seat back 11 of the seat 10 for seating a passenger and instantaneously generate gas when a vehicle collision is detected.

The seat back 11 of the seat 10 has installation spaces 12, each having a predetermined width, defined therein. The gas supply units 100 may be installed to the respective left and right installation spaces 12.

The gas supply units 100 may be electrically connected to a separate sensing means (not shown) for transmitting a vehicle collision monitoring signal.

The pair of main cushions 200 are deployed forward when receiving gas from the gas supply units 100 to restrain a passenger 1 from the sides, and may be connected to the gas supply units 100 in a state in which they are installed to the left and right sides of the seat back 11, respectively.

The main cushions 200 have filling chambers defined therein for injection of gas into the filling chambers, and the gas may be injected into the filling chambers from the gas supply units 100.

The main cushions 200 may be accommodated, with reduced volume, in the respective installation spaces 12 defined at the left and right sides of the seat back 11.

In more detail, each of the main cushions 200 may be divided into a first side body 210, a second side body 220, and a third side body 230.

The first side body 210 covers the upper body (shoulder, abdomen, pelvis, or the like) of the passenger from the side when deployed, and has a filling chamber defined therein. The rear of the first side body 210 may be connected to an associated one of the gas supply units 100.

The first side body 210 may have a vertical length, and may cover the upper body of the passenger 1 from the side when deployed.

The second side body 220 is bent from the upper end of the first side body 210 and extends obliquely toward the passenger 1 when deployed, so as to cover the shoulder of the passenger 1 from above.

The second side body 220 has a filling chamber defined therein and configured to communicate with the filling chamber of the first side body 210. The vertical length and angle of inclination of the second side body 220 are variable as necessary.

The third side body 230 is bent from the upper end of the second side body 220 and extends upward when deployed, so as to cover the head of the passenger 1 from the side.

The third side body 230 has a filling chamber defined therein and configured to communicate with the filling chamber of the second side body 220. The vertical length of the third side body 230 is variable as necessary.

The pair of auxiliary cushions 300 are deployed forward when receiving gas from the gas supply units 100 to restrain the passenger 1 from the front, and may be connected to the front sides of the main cushions 200 in a state in which they are installed to the left and right sides of the seat back 11, respectively.

The auxiliary cushions 300 have filling chambers defined therein for injection of gas into the filling chambers, and the gas may be injected into the filling chambers from the gas supply units 100.

The auxiliary cushions 300 are coupled to the front ends of the main cushions 200 while in communication with the main cushions 200, respectively. When the main cushions 200 are deployed, the auxiliary cushions 300 are deployed toward the seat 10 so as to restrain the upper body (chest, or the like) of the passenger 1 from the front.

In more detail, each of the auxiliary cushions 300 may be divided into a connection part 310 and a front support part 320.

The connection part 310 extends obliquely downward toward the front of the passenger 1 from the front end of the associated second side body 220 when deployed. A filling chamber defined in the connection part 310 communicates with the filling chamber of the second side body 220.

The connection part 310 extends obliquely to the side where the passenger 1 is located when deployed. The extension length and angle of the connection part 310 are variable as necessary.

The front support part 320 may extend downward from the front end of the connection part 310 when deployed, and may be positioned with a predetermined width in the front of the passenger 1.

The front support part 320 may have an upper end, at one side thereof, connected to the extended end of the connection part 310. A filling chamber defined in the front support part 320 communicates with the filling chamber of the connection part 310.

The front support parts 320 may each have a vertical length when deployed, and may be deployed to the front of the passenger 1 after the connection parts 310 are deployed, so that both sides of the chest of the passenger 1 are supported by the respective front support parts 320.

The pair of tethers 400 serve to exert a predetermined tensile force when the main and auxiliary cushions 200 and 300 are deployed. The tethers 400 pull the auxiliary cushions 300 to the side where the passenger 1 is located during deployment.

Both longitudinal ends of the tethers 400 are coupled to the seat back 11, and longitudinal latching sections 401 of the tethers 400 may be mounted on the front surfaces of the auxiliary cushions.

In more detail, longitudinal first connection ends 410 of the pair of tethers 400 may be coupled to the upper end of the seat back 11, and second connection ends 420 thereof opposite to the first connection ends 410 may be coupled to the respective left and right sides of the lower end of the seat back 11.

The first connection ends 410 may be coupled closer to the center position between the left and right sides of the seat back 11, compared to the second connection ends 420.

As illustrated in FIG. 5, one fastening member 500 may be formed at the upper end of the seat back 11 so that the first connection ends 410 of the tethers 400 are coupled to the fastening member 500 through the front of the seat back 11 at the same position.

In this case, the fastening member 500 may be vertically coupled to the first connection ends 410 through the upper end of the seat back 11, and the first connection ends 410 may be symmetrically positioned in the left and right directions based on the center position C where the fastening member 500 is formed.

Fastening members 500 may be formed at the left and right sides of the lower end of the seat back 11, respectively, so that the second connection ends 420 are connected to the fastening members 500.

In this case, the fastening members 500 may be horizontally coupled to the second connection ends 420 through the left and right sides of the lower end of the seat back 11.

As illustrated in FIG. 6, a pair of insertion holes 13 may be vertically formed at the left and right sides of the fastening member 500 provided at the upper end of the seat back 11.

The airbag apparatus may include a pair of headrest connecting beams 21 vertically movably coupled to the insertion holes 13.

In this case, the pair of tethers 400 may be coupled to the fastening member 500 by the respective first connection ends 410 through the rear sides of the headrest connecting beams 21 from the left and right sides of the headrest 20.

In this state, since the first connection ends 410 of the tethers 400 extend in a state in which they are supported by the rear ends of the headrest connection beams 21, it is possible to further increase the supporting force of the tethers 400.

That is, since the tethers 400 according to the present disclosure extend in a "V" shape in the left and right directions based on the center position C of the fastening member 500 formed at the upper end of the seat back 11, the tethers 400 may exert a larger tensile force when the airbag is deployed.

Alternatively, as illustrated in FIG. 7, fastening members 500 may be formed at the respective left and right sides of the upper end of the seat back 11.

In this case, the first connection ends 410 of the tethers 400 may be connected to the opposite fastening members 500, respectively, while intersecting in the left and right directions through the front of the seat back 11.

That is, the first connection ends 410 of the tethers 400 are connected to the respective left and right fastening members 500, and then extend in the opposite direction while intersecting in an "X" shape, thereby generating a larger lateral fixed load when the airbag is deployed.

Therefore, the first connection ends 410 of the tethers 400 have directionality from side to side in a state in which they are coupled to the fastening members 500, thereby exerting a larger tensile force. In addition, it is possible to prevent the main cushions 200, the auxiliary cushions 300, and the tethers 400 from being separated laterally when the airbag is deployed.

At least one connector 330 may be installed on the front surface of each of the auxiliary cushions 300 for coupling of the associated latching section. The connector 330 may have a hollow (not shown) through which the latching section 401 of the associated tether 40 is coupled.

In this case, the latching section 401 of the tether 400 may be movably coupled through the hollow, and the connector 330 may consist of a plurality of connectors in the longitudinal direction of the latching section 401.

Consequently, according to the present disclosure, it is possible to protect the passenger 1 by deploying the main and auxiliary cushions 200 and 300 through the sides of the seat 10 in the event of a vehicle collision so as to restrain the behavior of the passenger that is out of the protection area of the front and side airbags for responding to front and side collisions.

In addition, since the airbag is deployed to cover the side and front of the passenger 1 seated on the seat 10, it is possible to maintain the passenger protection performance in response to various seating conditions (angle, movement, rotation, etc.) and to reduce injuries to the passenger 1 by partially restraining the forward behavior of the passenger 1 to reduce the kinetic energy of the passenger 1 in a head-on collision situation.

Although the specific embodiments of the airbag apparatus according to the present disclosure have been described, it is obvious that various implementation modifications are possible without departing from the scope of the present disclosure.

Therefore, the scope of the present disclosure is limited to the described embodiments and should not be restricted, and should be determined by the claims and equivalents to the claims to be described later.

Although the exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An airbag apparatus comprising:
    first and second main cushions disposed respectively at left and right sides of a seatback and configured, when supplied with gas, to deploy forward and laterally cover left and right sides of a passenger, respectively, to restrain the passenger from moving laterally;
    first and second auxiliary cushions coupled to front ends of the first and second main cushions, respectively, and configured to deploy laterally toward each other and cover a front side of the passenger to restrain the passenger from moving forward; and
    first and second tethers coupled to the seatback,
    wherein the first tether is configured to exert a first rearward tensile force to the first main cushion and first auxiliary cushion when the first main cushion and first auxiliary cushion are deployed, the first tether comprising (1) first and second ends respectively coupled to an upper portion and lower left portion of the seatback and (2) a first longitudinal latching section coupled to a front surface of the first auxiliary cushion,
    wherein the second tether is configured to exert a second rearward tensile force to the second main cushion and second auxiliary cushion when the second main cushion and second auxiliary cushion are deployed, the second tether comprising (1) first and second ends respectively coupled to the upper portion and a lower right portion of the seatback and (2) a second longitudinal latching section coupled to a front surface of the second auxiliary cushion,
    wherein the first main cushion comprises:
        a first side body configured to laterally cover a left side of the passenger's upper body when deployed;
        a second side body configured to extend diagonally from an upper end of the first side body toward the passenger and laterally cover the passenger's left shoulder when deployed; and
        a third side body configured to extend upwardly from an upper end of the second side body and laterally cover an entire left side of the passenger's head when deployed, and
    wherein the second main cushion comprises:
        a first side body configured to laterally cover a right side of the passenger's upper body when deployed;
        a second side body configured to extend diagonally from an upper end of the first side body toward the passenger and laterally cover the passenger's right shoulder when deployed; and
        a third side body configured to extend upwardly from an upper end of the second side body and laterally cover an entire right side of the passenger's head when deployed.

2. The airbag apparatus of claim 1, wherein the first ends of the first and second tethers are positioned closer to a horizontal center of the seatback than the second ends of the first and second tethers are.

3. The airbag apparatus of claim 1, further comprising a fastening member coupled to the upper portion of the seatback and configured to fix the first ends of the first and second tethers to the upper portion of the seatback.

4. The airbag apparatus of claim 3, wherein:
    the seatback comprises (1) first and second insertion holes respectively disposed at left and right sides of the fastening member, and extending downwardly from the upper portion of the seatback, and (2) first and second headrest connecting beams extending from the seatback through the first and second insertion holes, respectively, and connected to a headrest, and
    wherein the fastening member is disposed at a rear of the first and second headrest connecting beams.

5. The airbag apparatus of claim 1, wherein:
    the seatback comprises first and second fastening members respectively disposed at upper left and right portions of the seat back, the first end of the first tether is coupled to the second fastening member, and the first end of the second tether is coupled to the first fastening member, and
    the first and second tethers intersect each other at the upper portion of the seatback.

6. An airbag apparatus comprising:
    a pair of main cushions installed to respective left and right sides of a seatback and deployed forward when gas is delivered to an internal filling chamber, to restrain a passenger from sides;
    a pair of auxiliary cushions coupled to respective front ends of the main cushions while in communication with the main cushions and deployed laterally at one ends thereof to restrain the passenger from a front; and
    a pair of tethers coupled to the respective left and right sides of the seatback,
    wherein the pair of tethers are configured such that both longitudinal ends thereof are coupled to the seatback and longitudinal latching sections thereof are mounted on respective front surfaces of the auxiliary cushions, and the tethers exert a tensile force rearward when the main and auxiliary cushions are deployed,
    wherein each of the main cushions comprises:
        a first side body configured to cover an upper body of the passenger from side when deployed;

a second side body bent from an upper end of the first side body and extending obliquely toward the passenger when deployed, so as to cover a shoulder of the passenger from above; and a third side body bent from an upper end of the second side body and extending upward when deployed, so as to cover a head of the passenger from the side, and wherein each of the auxiliary cushions comprises:

a connection part extending obliquely downward toward a front of the passenger from a front end of the second side body when deployed; and a front support part extending downward from a front end of the connection part when deployed, and positioned in the front of the passenger.

7. The airbag apparatus of claim 6, wherein the front support part is provided, at its front, with at least one connector so that a latching section of an associated one of the tethers is coupled to the connector.

8. The airbag apparatus of claim 7, wherein:

the connector has a hollow through which the latching section is coupled; and the latching section is movably coupled through the hollow.

9. The airbag apparatus of claim 1, wherein:

the seatback has a pair of installation spaces at the left and right sides of the seatback, respectively, and the pair of main cushions, the pair auxiliary cushions and the pair of tethers are stored at the pair of installation spaces.

10. The airbag apparatus of claim 1, further comprising a gas supply unit provided in the seatback to supply gas to the main cushions.

\* \* \* \* \*